May 8, 1923.
C. LALAMA
1,454,680
PRESSURE VALVE
Filed March 8, 1922
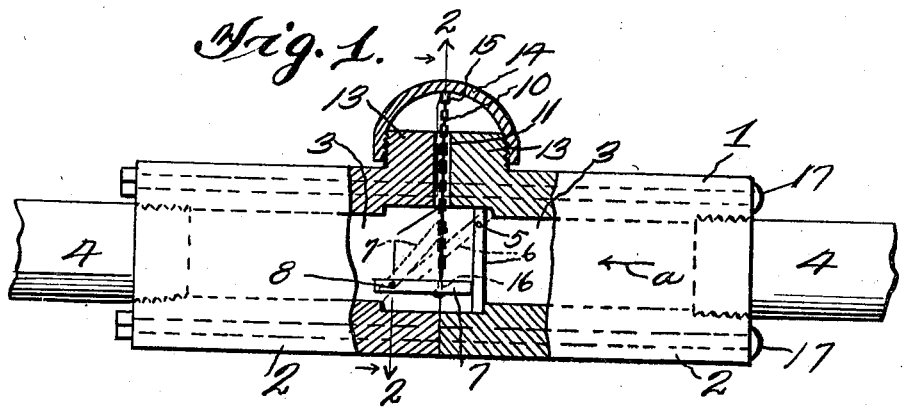
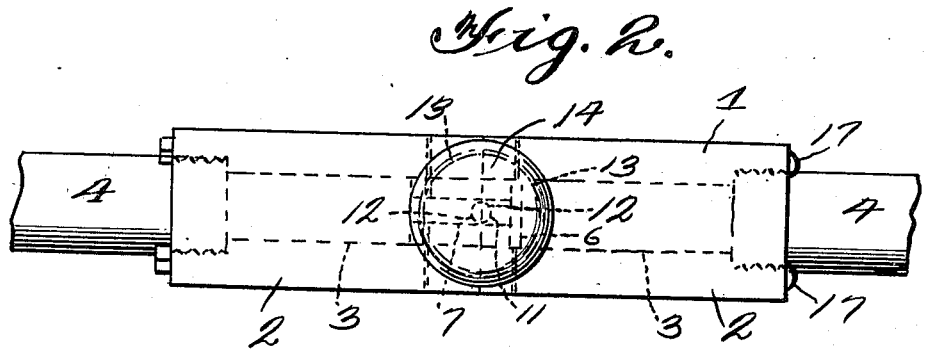
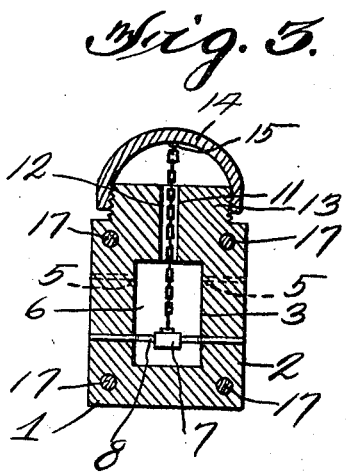
Inventor
C. Lalama
By D. Swift
Attorney Patented May 8, 1923.

1,454,680

UNITED STATES PATENT OFFICE.

CARLO LALAMA, OF BEAVER FALLS, PENNSYLVANIA.

PRESSURE VALVE.

Application filed March 8, 1922. Serial No. 541,981.

*To all whom it may concern:*

Be it known that I, CARLO LALAMA, a subject of the King of Italy, residing at Beaver Falls, in the county of Beaver, State of Pennsylvania, have invented a new and useful Pressure Valve; and I do hereby declare the following to be a full, clear, and exact description of the invention, such as will enable others skilled in the art to which it appertains to make and use the same.

The invention relates to pressure valves particularly adapted for use in connection with gas pipes, and has for its object to provide a valve which will normally be open when pressure is in the pipe line and will be held in closed position after pressure has been lost in the pipe line and then again supplied in the pipe line. The advantage in providing such a valve is to prevent asphyxiations, which is commonly caused by loss of pressure, which causes the light to go out, and when the pressure is again supplied, the unlighted gas passes to the room.

A further object is to provide means whereby it will be necessary to open the valve manually, thereby insuring the opening of the valve by an authorized person.

A further object is to provide a gas pressure valve comprising a casing formed in two sections and detachably secured together, a gravity actuated disc valve in one section, a lock arm pivoted in the other section and normally held in up position by means of the disc valve and positioned whereby when the disc is seated it will be held seated until it is again manually opened.

A further object is to provide a valve casing with a cap threaded thereon, said cap having a chain connection with the pivoted arm and forming means whereby the pivoted arm may be raised and the disc valve allowed to open under pressure.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawing:—

Figure 1 is a side elevation of the valve partly in section, showing the disc valve held closed.

Figure 2 is a top plan view of the valve.

Figure 3 is a vertical transverse sectional view through the valve taken on line 2—2 of Figure 1.

Referring to the drawings, the numeral 1 designates a valve casing, which casing is formed from two elongated sections 2, which sections are provided with chambers 3 in axial alignment with each other. Threaded into the outer ends of the casing sections 2 are pipes 4, which pipes form the pipe line through which gas passes in the direction of the arrow *a*. It has been found that where pressure is lost in gas pipe lines leading into houses and again restored, that during the loss of pressure that lights in various rooms throughout the house go out, and that upon the restoration of pressure illuminating gas flows into the room thereby endangering the lives of sleeping occupants in the room. Pivotally mounted at 5 in one of the chambers 3 is a disc valve 6, which when in vertical position as shown in full lines in Figure 1 prevents flow of gas through the valve casing in direction of the arrow *a* and when in dotted line position as shown in Figure 1 allows the flow of gas through the pipe line. The gas passing through the pipe line maintains the disc valve 6 in raised position, and when the flow of gas stops the valve 6 assumes a vertical position, as shown in Figure 1. When the flow of gas stops the disc valve moves to vertical position and the arm 7 which is pivoted on a cross rod 8 moves downwardly by gravity until it is in a horizontal position with its free end in engagement with the disc valve 6, thereby preventing the disc valve from being raised by the passage of gas when the supply of gas is restored, thereby preventing flow of gas through the different burners throughout the house. Connected to the arm 7 at 9 is a chain 10, which chain extends upwardly through an aperture 11 in the casing 1, which aperture is formed by segmentally shaped channels 12 in the adjacent engaging sides of the casing sections 2. Each section 2 is provided with a segmentally shaped upwardly extending threaded member 13, which when brought together form a boss on which the cap 14 is threaded. The cap 14 prevents the escape of gas to the atmosphere through the aperture 11 and also forms means to which the upper end of the chain is connected at 15. When it is desired to allow the flow of gas through the valve casing, the cap 14 is unscrewed, thereby allowing the arm 7 to be raised to the dotted line position shown in Figure 1, which will allow the disc valve 6 to move to the dotted line position shown in Figure 1. The lower end of the chain 10 is preferably swivelly connected at 15 to the arm 7, thereby allowing pivotal action which will not interfere with the removal or replacement of the cap 14. The valve casing sections 2 are held in close engagement with each other by means of longitudinally disposed bolts 17, which pass through said sections.

From the above it will be seen that a cut off valve is provided, which is controlled by the loss of pressure and which will cut off the flow of gas upon loss of pressure and will prevent the flow of gas when the pressure is restored. Also that the flow of gas may be easily and quickly restored. The device is particularly adapted for use near gas meters where it will control entire flow of gas into a building.

The invention having been set forth what is claimed as new and useful is:—

A pressure control valve comprising a casing, a gravity actuated horizontally pivoted disc valve in said casing, said disc valve being normally held in raised open position by the flow of fluid through the valve, a member horizontally pivoted in the valve and normally held in raised position by engagement of the free end thereof with the disc valve, said member forming means for holding the disc valve against raising upon loss of pressure and the resumption of pressure by assuming a horizontal position with its free end in engagement with one side of the disc valve, a flexible member connected to the pivoted member at a point spaced from its pivotal point, said flexible member extending through an aperture in the casing, a removable cap carried by the casing and housing the aperture therein, said flexible member having its outer ends connected to the removable cap, said flexible member forming means for limiting the pivoted member in a horizontal position upon a downward movement thereof.

In testimony whereof I have signed my name to this specification in the presence of two subscribing witnesses.

CARLO LALAMA.

Witnesses:
LAWRENCE LAMPORTE,
HOMER H. SWANEY.